United States Patent [19]

Feller et al.

[11] Patent Number: 4,669,758

[45] Date of Patent: Jun. 2, 1987

[54] HIGH PRESSURE, MULTIPLE PASSAGE SWIVEL

[75] Inventors: Murray D. Feller, Cobham, United Kingdom; Colin Ostick, Langley, Canada

[73] Assignee: Novacorp International Consulting Ltd., Alberta, Canada

[21] Appl. No.: 691,638

[22] Filed: Jan. 15, 1985

[30] Foreign Application Priority Data

Jan. 24, 1984 [CA] Canada ................................... 445921

[51] Int. Cl.$^4$ ........................................... F16L 17/00
[52] U.S. Cl. ..................................... 285/94; 285/900; 285/95; 285/108; 285/134; 285/136; 277/27
[58] Field of Search ...................... 285/94, 95, 96, 106, 285/134, 136, 190, DIG. 1, 98, 108, 351; 277/27

[56] References Cited

U.S. PATENT DOCUMENTS

| 2,325,464 | 7/1943 | Bannister | 285/190 |
| 2,877,026 | 3/1959 | Payne et al. | 285/94 |
| 3,290,065 | 12/1966 | Poratn | 285/94 |
| 4,126,336 | 11/1978 | Ortloff et al. | 285/136 |
| 4,405,162 | 10/1983 | Williams | 285/136 |
| 4,602,806 | 7/1986 | Saliger | 285/41 |

FOREIGN PATENT DOCUMENTS

| 745053 | 10/1966 | Canada | 285/136 |
| 2716724 | 10/1967 | Fed. Rep. of Germany | 285/136 |
| 2132726A | 7/1984 | United Kingdom | 285/41 |
| 524950 | 8/1976 | U.S.S.R. | 285/136 |

Primary Examiner—Richard J. Scanlan, Jr.
Assistant Examiner—Eric R. Nicholson
Attorney, Agent, or Firm—Cushman, Darby & Cushman

[57] ABSTRACT

A multi passage swivel assembly provides fluid or gas flow while continuous or intermittent rotation occurs between a fixed inlet port and a rotating outlet port. The assembly contains a clearance control ring that compensates for dimensional change to allow high pressure operation.

4 Claims, 5 Drawing Figures

HIGH PRESSURE, MULTIPLE PASSAGE SWIVEL

This invention relates to swivel assemblies for floating production systems.

BACKGROUND OF THE INVENTION

The advent of floating production systems has produced a variety of single-point mooring methods whereby a fixed production riser is connected to a surface vessel. These system require swivel assemblies and the present invention is directed to these assemblies but is not necessarily restricted thereto. The swivel assemblies are required because the riser remains in a fixed position while the vessel is free to rotate due to wind and current effects. The swivel assemblies according to the present invention can be used in conjunction with the apparatus described in copending U.S. patent application Ser. No. 578,204 entitled "Apparatus And Method For Connecting Subsea Production Equipment To A Floating Facility" filed Feb. 7th, 1984.

The existing swivel assembly systems using conventional seals technology have poor reliability and low pressure ratings. The seals rapidly break down because of excellerated wear caused by contaminants in the produced fluid and the effects of dimensional instability. At high pressures, 10,000 psig and above, structural deflection is a major design problem. Seal retaining grooves must remain in close proximity to the sealing surface in order to maintain seal integrity.

SUMMARY OF THE INVENTION

The present invention is directed to an apparatus and method of controlling adverse structural deflections in the swivel assemblies. According to the arrangement of the present invention, seal surfaces are continuously cleaned with a lubricating fluid. This significantly increases the life of the seals and improves overall system reliability. As a consequence of protecting the seals from abrasive contaminants in oil production systems, a general principle of the invention may be applied to many areas of industry other than that described in this application.

An additional problem which exists in present designs is also reduced in that the type of seals used in accordance with the invention will be pressure energized. Accordingly, as pressure increases, seal friction increases. The problem this creates is a large break-out torque required to operate the swivel. The pressure balancing system which is required to activate clearance control rings can be used to create smaller pressure differentials in the intermediate passes of the swivel. This will create a significant lowering of stress levels in the production riser.

The use of the present invention will permit floating production systems to be applied to high pressure applications which were previously not capable of production by the single-point moor method.

According to a broad aspect, the invention relates to a high pressure swivel assembly for providing gas or liquid to flow therethrough during rotation between a fixed inlet port and a rotating outlet port, the assembly comprising a fixed central arbour adapted for securement to a riser and having at least one bore therein. A rotatable fluid take-off element is mounted on the arbour and includes an annular passageway communicating with the arbour bore and an outlet port in communication with the passageway. A pair of clearance control rings are mounted on the inner surface of the take-off element, one above and one below the annular passageway and concentric therewith. Each clearance control ring has at least one annular groove with a dynamic seal and O ring therein, the inner diameter of the control ring and the dynamic seal sealingly engages the adjacent surface of the arbour. The arrangement is such that an unequal pressure distribution exists between the outside diameter and the inside diameter of the clearance control ring so that any structural deflection of the control ring will cause the inside diameter of the clearance control ring to maintain contact with the surface of the arbour.

The invention is illustrated by way of example in the accompanying drawings in which.

Figure 1:
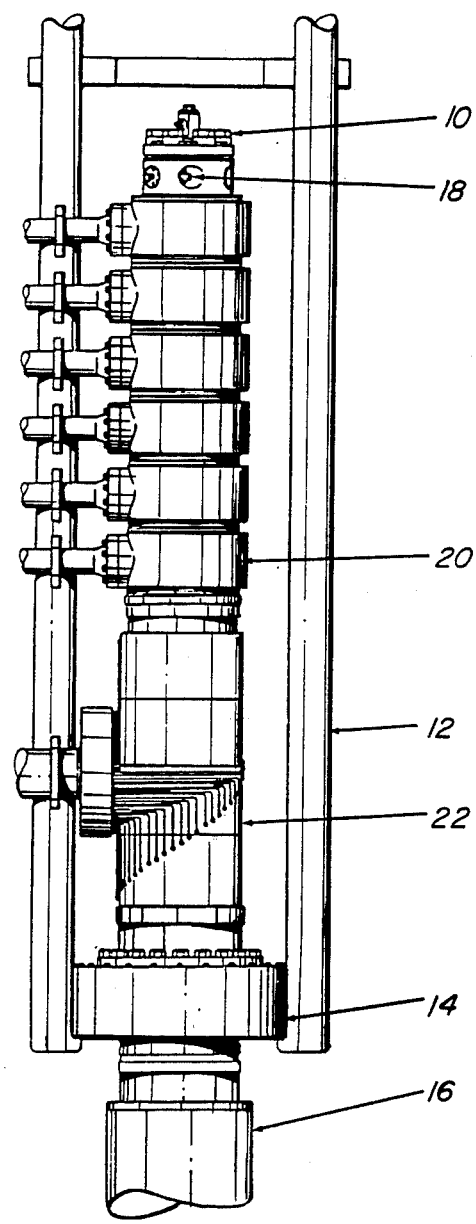
FIG. 1 is an elevation view of a composite riser, multi-pass swivel assembly.
Figure 2:
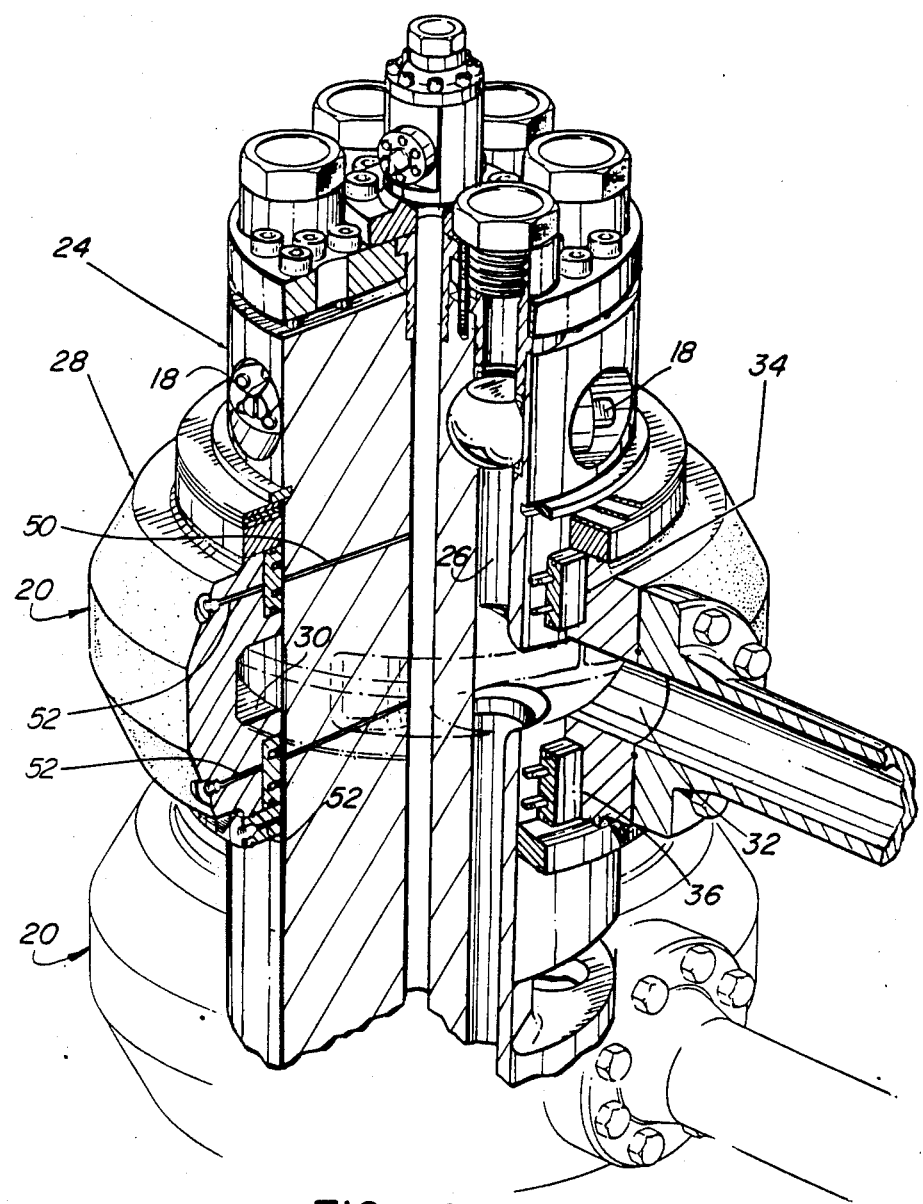
FIG. 2 is a perspective view of a swivel assembly used in the composite arrangement of FIG. 1.

Referring to FIG. 1, a multi-pass swivel assembly 10 is made up of fixed and rotating components. A riser tensioning support 12 includes a thrust bearing support assembly 14 secured to a riser connector 16 as illustrated. The upper end of the assembly includes a vertical access shut off valve 18 and a series of production line swivel assemblies such as 20 are stacked one upon the other. A control lines swivel arrangement 22 is also included. Referring to FIG. 2, two swivel assemblies 20 are shown mounted on a central arbour 24 which is fixed relative to the production riser 16 (FIG. 1). The arbour has at least one central bore 26 therein which connects with the riser production tubing, not shown. Each arbour bore 26 connects with a rotating fluid take-off element 28 which is mounted for rotation on the arbour 24 and which includes an annular passageway 30 that communicates with the arbour bore 26, both of which communicate with an outlet port 32.

Each take-off element 28 includes two clearance control rings 34, 36 and internal porting for pressure balance fluid. As shown in FIG. 2, control ring 34 is mounted above and ring 36 is mounted below the annular passageway 30 and parallel thereto.

Figure 3:
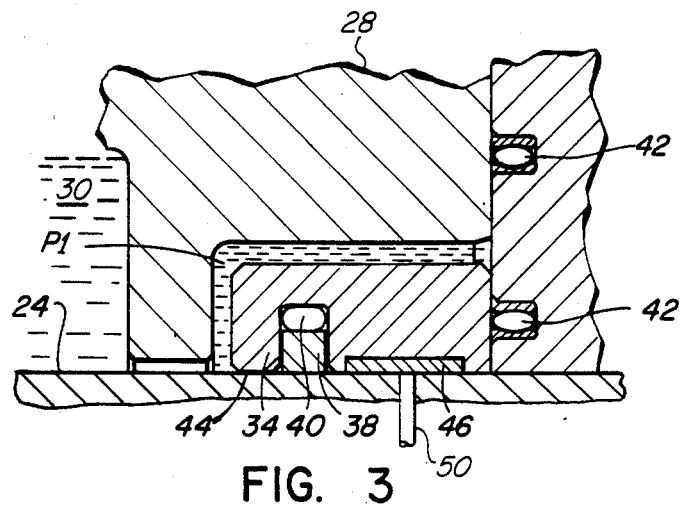
FIG. 3 is a sectional, fragmentary view of a portion of one embodiment of a seal arrangement according to the present invention.

One embodiment of the control ring is shown in FIG. 3. Pressurized product fluid $P_1$ surrounds the clearance control ring 34 from the pressurized side of a dynamic seal 38 and its associated O ring 40 to the pressurized side of a static seal 42. It is assumed, for the purpose of description, that the downstream side of both seals is drained or maintained at a much lower pressure than the product flow. An the unequal pressure distribution exists between the outside diameter and the inside diameter of the clearance control ring 34, so that any stuctural deflection of the control ring 34 will cause the inside diameter 44 of the clearance control ring 34 to maintain contact with the adjacent surface of the arbour 24. In this way, seal support is maintained and failure due to extrusion or loss of support due to excess clearance is prevented. Various shapes of the clearance control ring 34 can be provided in combination with material selection in order to tailor the "foot print" pressure profile. Additionally, bearing inserts 46 maybe incorporated if the required properties are not present in the clearance control ring material itself.

Figure 4:
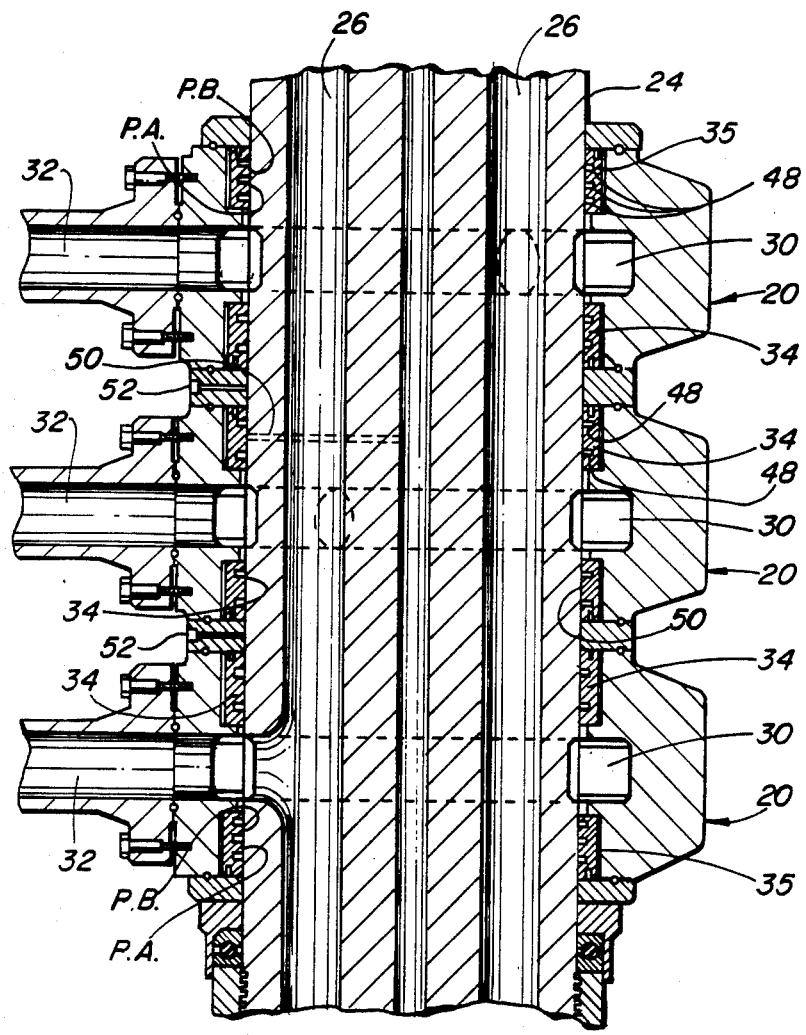
FIG. 4 is a sectional view through a composite swivel assembly.

Referring to FIG. 4, several take-off elements 20 are mounted on the arbour 24, the passageways 30 being in communication with the outlet ports 32. The clearance control rings are provided with two dynamic seals 48 and in this arrangement where the swivel assembly has three flow paths incorporating this feature, partial pressure balancing is utilized. Lubricating oil is introduced between the seals from galleries 50 FIGS. 2 and 5 at a pressure $P_3$ above the product fluid $P_1$. Further galleries 52 are maintained at a pressure $P_2$ which is at some increment higher than galleries 50 $P_3$.

Two principle advantages result from this arrangement. Firstly, reduced friction will be present because a relatively small pressure differential is maintained across center-section seals. Since the seals are pressure enerized, this will have an increasing advantage as additional center-sections are added. Secondly, seals having pressure ratings lower than the product fluid pressure can be utilized because the pressure step across each seal can be maintained within a given tolerance. As shown in FIG. 4, the two clearance control rings 35 at the extreme ends of the swivel contain three dynamic seals 48 illustrating both additional redundancy for containment of the produced fluid and additional pressure steps (if required) to reduce the pressure differential per seal. Pressure PA is utilized either as an additional pressure step or as in common with PB.

Figure 5:
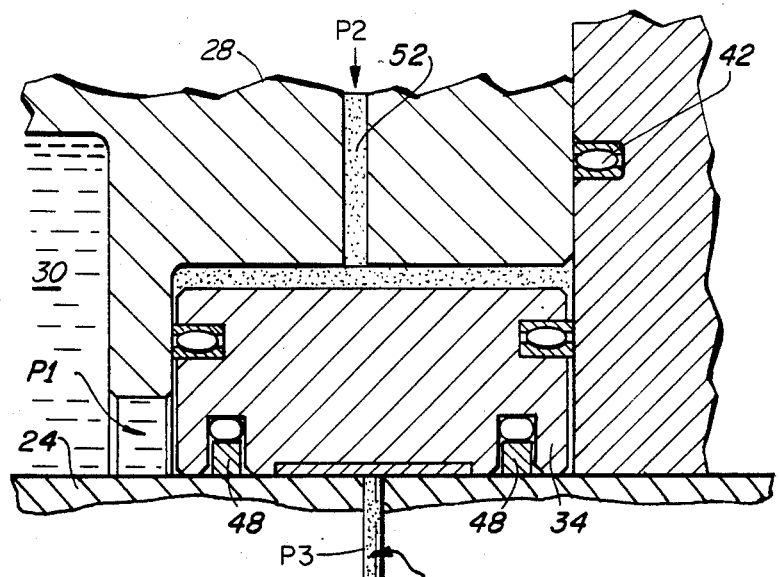
FIG. 5 is a view similar to FIG. 3 and showing another seal arrangement.

The seal arrangement shown in FIG. 4 is illustrated in a preferred embodiment in FIG. 5. In this case, one additional static seal is added to the clearance control ring.

There are three pressure sources illustrated in FIG. 5:
$P_1$ = Product pressure (0–10,000 psi or higher)
$P_2$ = Gallery pressure, set to balance the sum of $P_1 + P_3$
$P_3$ = Lubrication pressure, normally low, the primary function of which is to provide a lubrication service.

The following relationship exsists:
Gallery pressure $P_2$ more than product pressure $P_1$;
Lubrication pressure $P_3$ less than gallery pressure $P_2$;
Product pressure $P_1$ less than lubrication pressure $P_3$.

By adjusting the gallery pressure $P_2$, the clearance control ring 34 can be physically changed dimensionally, increasing or decreasing the contact pressure on the central arbour and controlling the sealing gap independent of the production fluid, $P_1$.

In the arrangement of FIG. 5, clean lubricating oil is fed through galleries 52 at a pressure $P_2$ above the product pressure $P_1$. Galleries 50 are also fed with a clean supply at a pressure $P_3$ below pressure $P_2$ in gallery 52 but slightly higher than product pressure $P_1$. This arrangement, because of the pressure differential described above, produces a controlled deflection of the clearance control ring 34. The advantage of this arrangement over that shown in FIG. 4 is caused by the direction of leakage. In the arrangement of FIG. 5, the leakage from high pressure or outside to the low pressure or inside of the clearance control ring 34 takes place with clean fluid moving across the seal. This results in purging of the seal surfaces of contaminants from the produced fluids permitting much longer life. The volume of lost fluid into the production flow will not be large. The economics of such a system, which now has additional complexity over conventional systems, will be justified in terms of enhanced reliability and new applications that the present invention makes possible. The auxiliary pressure balance and lubrication system will be designed to accommodate parallel components to permit replacement while the system is in service. Low duty cycle pumps and leakage monitoring equipment will ensure reliable operation and continuous indication of the state of the equipment.

No particular seal configuration is necessary to carry out the present invention, existing propriety seals of various types may be used.

It will be appreciated that the present invention provides a pressure-actuated clearance control ring and a system of pressure compensation which prevents contaminated fluid from entering critical sealing areas. Seal surfaces are continually cleaned with lubricating fluid and controlling the pressure differential between pressure sources $P_1$, $P_2$ and $P_3$ can control breakaway torque, reducing the pressure differentials in the intermediate passes of the swivel and consequently lowering stress levels in the production riser. The invention also provides a method of reducing internal friction and thus generated torque.

While the invention has been described in connection with a specific embodiment thereof and in a specific use, various modifications of the invention will occur to those skilled in the art without departing from the spirit and scope of the invention as set forth in the appended claims. The application of the concept will be in the areas where abrasive or corrosive fluids under pressure require to be taken through a swivel.

The terms and expressions which have been employed in this specification are used as terms of description and not of limitation and there is no intention in the use of such terms and expressions to exclude any equivalence of the features shown and described or portions thereof. It is recognized that various modifications are possible within the scope of the invention claimed.

The embodiments of the invention in which an exclusive property or privilege is claimed are defined as follows:

1. A high production pressure swivel assembly for providing gas or liquid to flow therethrough during rotation between a fixed inlet port and a rotating outlet port, said assembly comprising:
   a fixed central arbour adapted for securement to a production riser, said arbour having at least one bore therein;
   at least one rotatable fluid take-off element mounted for rotation on said arbour and including an annular passageway therein communicating with said arbour bore and an outlet port in communication with said passageway;
   and a pair of clearance control rings mounted on the inner surface of the take-off element, one clearance control ring located above and one clearance control ring located below said annular passageway and concentric therewith;
   each of said clearance control ring having at least one annular groove with a dynamic seal and "O" ring therein, the inner diameter of said control rings and the dynamic seal sealingly engaging the adajcent surface of said arbour; and
   gallery means in said take-off element for feeding lubricating fluid, at a pressure above the product pressure in said annular passageway, to the outer diameter of said clearance control ring whereby an unequal pressure distribution exists between the outside diameter and the inside diameter of the clearance control ring so that any structural deflection of the control ring will cause said inside diameter of the clearance control ring to maintain contact with the surface of the arbour.

2. A high production swivel assembly for providing gas or liquid to flow therethrough during rotation between a fixed inlet port and a rotating outlet port, said assembly comprising:

a fixed central arbour adapted for securement to a production riser, said arbour having at least one bore therein;

at least one rotatable fluid take-off element mounted for rotation on said arbour and including an annular passageway therein communicating with said arbour bore and an outlet port in communication with said passageway;

and a pair of clearance control rings mounted on the inner surface of the take-off element, one clearance control ring located above and one clearance control ring located below said annular passageway and concentric therewith;

each of said clearance control rings having at least a pair of annular grooves therein with a dynamic seal and "O" ring in each of said grooves, the inner diameter of said control ring and said dynamic seals sealingly engaging the adjacent surface of said arbour;

galleries in said arbour for introducing lubricating oil between the surfaces of said arbour and said control ring intermediate said dynamic seals; and gallery means in said take-off element for feeding lubricating fluid, at a pressure above the product pressure in said annular passageway, to the outer diameter of said clearance control ring whereby an unequal pressure distribution exists between the outside diameter and the inside diameter of the clearance control ring so that any structural deflection of the control ring will cause said inside diameter of the clearance control ring to maintain contact with the surface of the arbour.

3. An assembly according to claim 1 wherein at least two dynamic seals are provided in said clearance control ring, and galleries in said arbour for introducing lubricating oil between the surfaces of the arbour and the cotnrol ring and intermediate said dynamic seals.

4. An assembly according to claim 3 wherein galleries are provided in said take-off element for feeding lubricating oil at a pressure in said rotatable fluid take-off element above the product pressure to the outer diameter of said clearance control ring.

* * * * *